A. LATTAU.
AUTOMATIC PHOTOGRAPHING APPARATUS.
APPLICATION FILED JUNE 2, 1910. RENEWED FEB. 23, 1916.
1,199,085.
Patented Sept. 26, 1916.
4 SHEETS—SHEET 1.
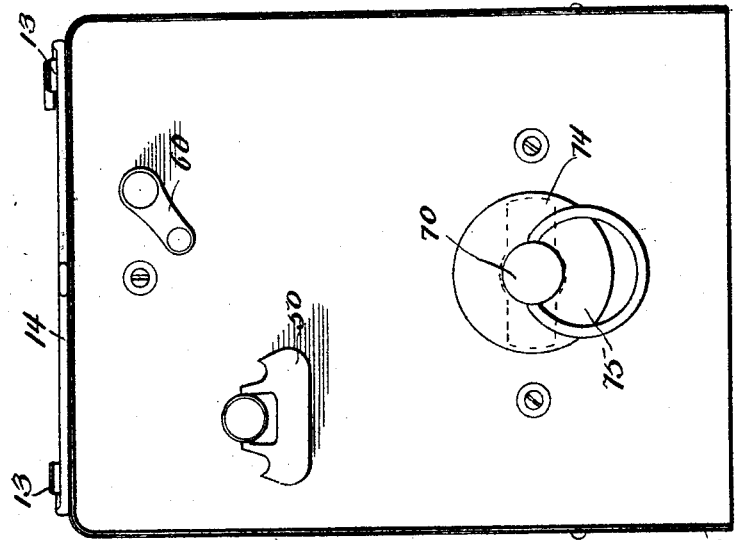
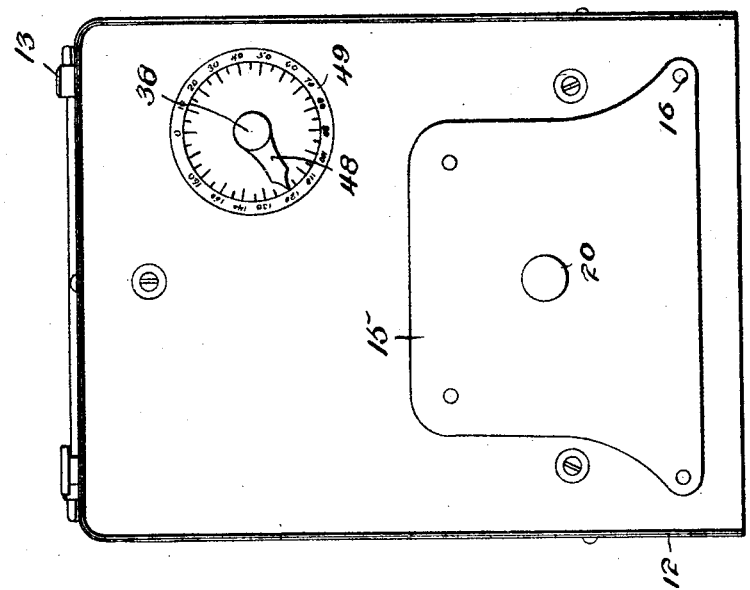

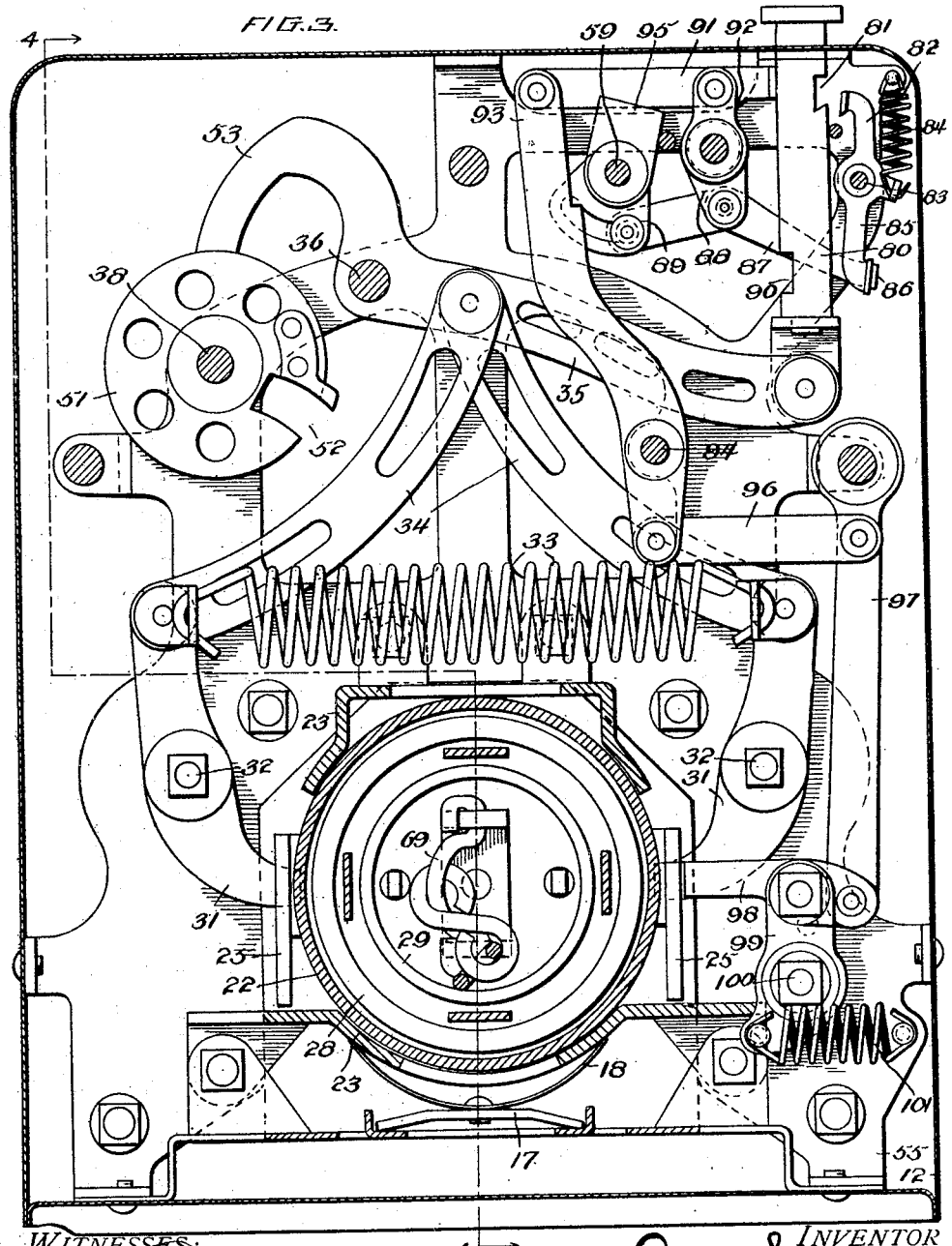

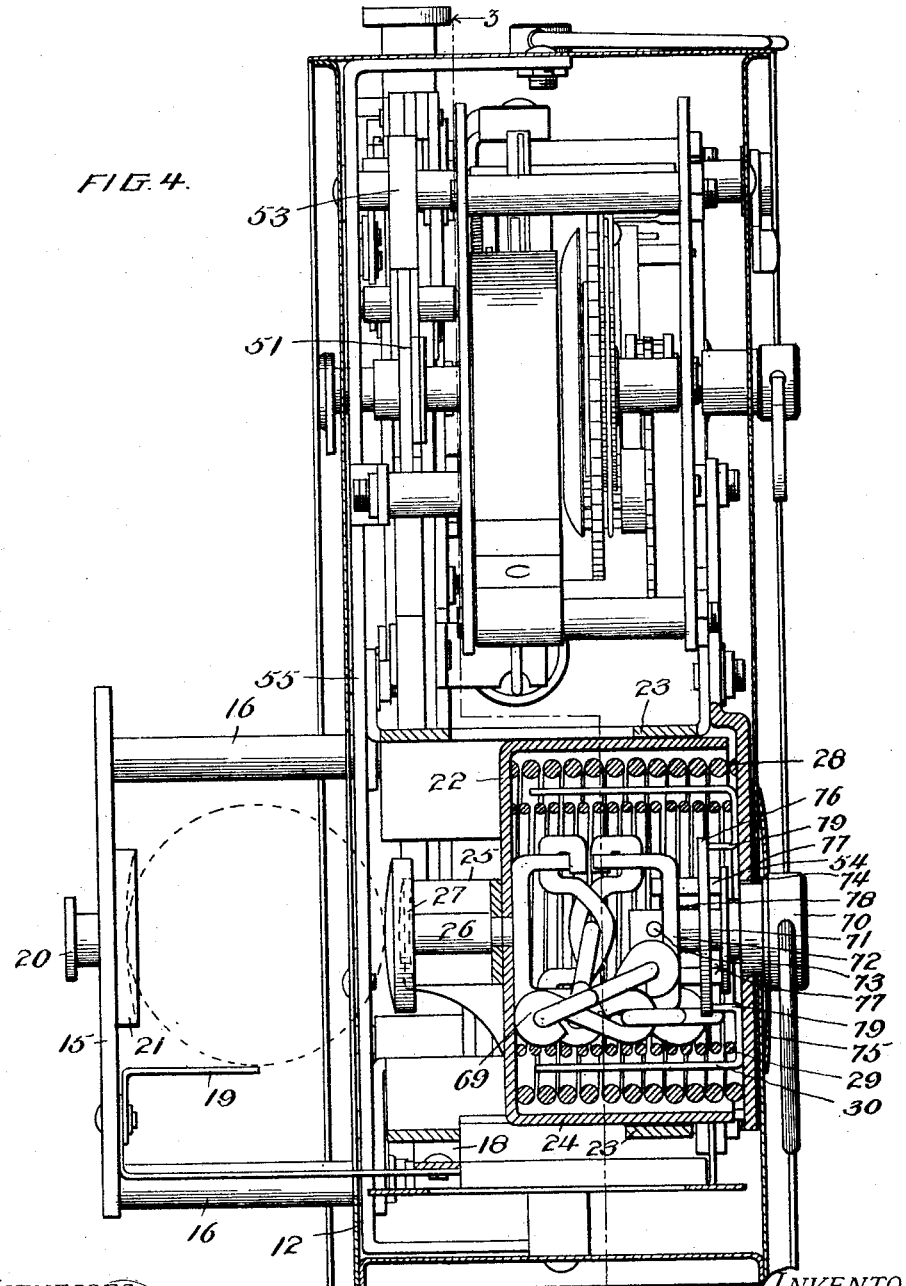

A. LATTAU.
AUTOMATIC PHOTOGRAPHING APPARATUS.
APPLICATION FILED JUNE 2, 1910. RENEWED FEB. 23, 1916.
1,199,085.
Patented Sept. 26, 1916.
4 SHEETS—SHEET 4.
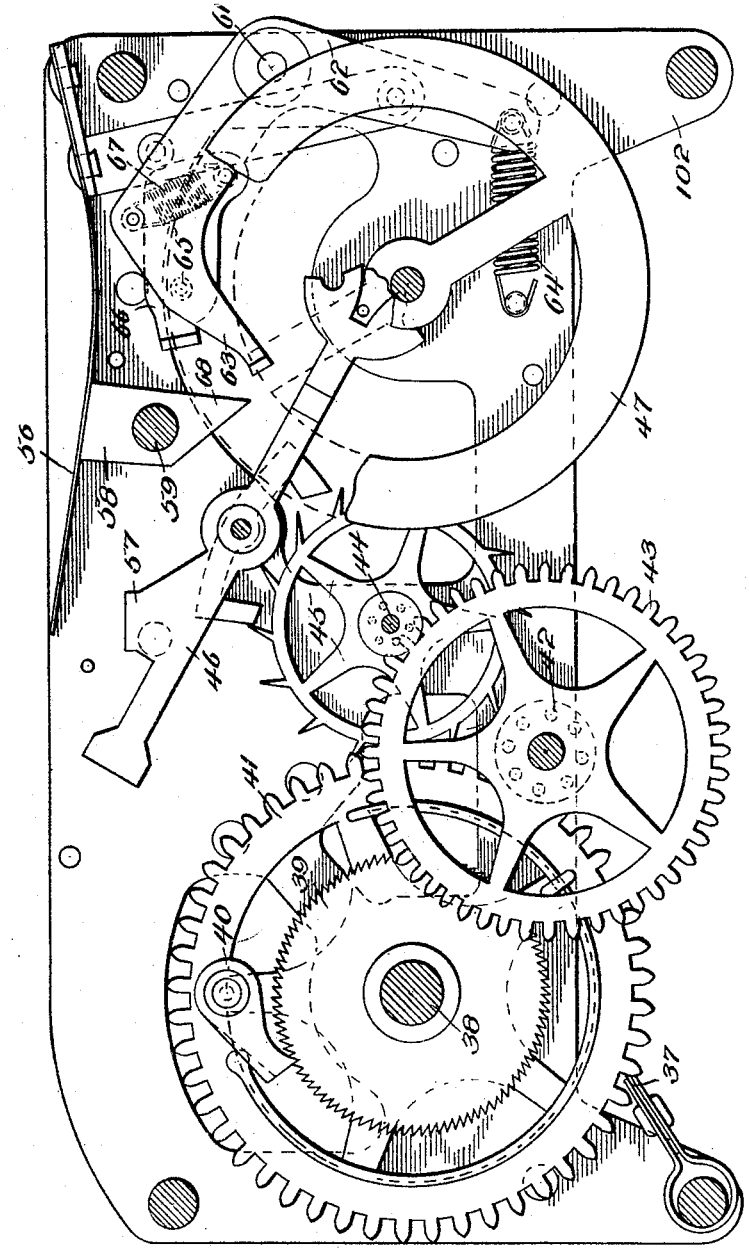

UNITED STATES PATENT OFFICE.

ARTHUR LATTAU, OF NEW YORK, N. Y.

AUTOMATIC PHOTOGRAPHING APPARATUS.

1,199,085. Specification of Letters Patent. Patented Sept. 26, 1916.

Application filed June 2, 1910, Serial No. 564,692. Renewed February 23, 1916. Serial No. 80,087.

*To all whom it may concern:*

Be it known that I, ARTHUR LATTAU, a citizen of the United States, residing at New York, in the county of New York and State of New York, have invented or discovered certain new and useful Improvements in Automatic Photographing Apparatus, of which the following is a specification, reference being had therein to the accompanying drawings.

This invention relates to apparatus for automatically exposing a photographic camera at a predetermined time in the absence of the operator, more particularly to apparatus of the general type shown and described in Letters Patent No. 1,092,273, granted to me April 7, 1914, and the invention has for its objects to provide certain improvements in such apparatus whereby the same is rendered more convenient for use, and whereby the necessary setting and adjustment of the apparatus is facilitated and rendered more accurate and certain. These and other objects of the invention, together with means whereby the same may be carried into effect, will best be understood from the following description of one embodiment thereof shown in the accompanying drawings. It will be understood, however, that the form shown and described has been chosen for illustrative purposes merely, and that many changes may be made therein without departing from the spirit and scope of the invention.

In said drawings, Figure 1 is a front elevation of the apparatus. Fig. 2 is a rear elevation thereof. Fig. 3 is a vertical section taken substantially on the line 3—3, Fig. 4. Fig. 4 is a vertical section taken on the line 4—4, Fig. 3. Fig. 5 is a detail elevation, partly in section, of the clockwork employed.

The mechanism of my apparatus is preferably inclosed in a casing 12 provided on its upper side with a pair of apertured lugs 13 for the reception of the ends of a loosely mounted bail or handle 14 whereby the apparatus may be supported or suspended, preferably substantially as described in my prior patent aforesaid. A suitable receptacle is provided for the reception of the end of a flexible power transmitter herein shown as a rubber bulb by which the camera shutter is usually operated, said receptacle preferably comprising a drawer consisting of a front plate 15, rods 16 suitably guided in the casing, a bottom plate 17, also guided in the casing, and provided with a spring 18 whereby the drawer is retained in adjusted position, and a preferably adjustable bracket 19 for supporting the bulb. The drawer is also preferably provided with a handle 20 and with an elastic pad 21 serving as an abutment for the bulb.

Within the casing 12 is provided a shutter operating mechanism together with a suitable time-controlling mechanism for regulating the operation of the shutter-operating mechanism. Said shutter operating mechanism comprises an actuator and means for restraining the same until the predetermined time for exposure. The actuator preferably comprises means for compressing the usual shutter bulb, herein shown as a plunger 22 mounted to reciprocate in suitable guides 23 in the casing, and consisting of a tubular member 24 to which are secured side plates 25 and a neck 26 terminating in a suitable bulb-engaging head 27, together with means for actuating said plunger 22, the latter being herein shown as a plurality of strong spiral springs 28 and 29, preferably separated by plates 30, stationary with the casing.

For restraining the plunger there is provided a pair of levers 31 pivoted at 32 in the casing and engaging at their lower ends the plates 25, and connected at their upper ends by a spring 33. For controlling, and at the proper time releasing the levers 31, are a pair of toggle links 34 pivoted at their upper ends to a lever 35 and at their lower ends to the levers 31, said lever 35 being fulcrumed at 36 within the casing.

In the embodiment of the invention shown the time controlling mechanism comprises a clockwork and operative connections whereby movement of the levers 31 under the influence of their spring 33 to release the plunger 22 is controlled. The clockwork as herein shown comprises a main spring 37 secured to a winding post 38 on which is secured a ratchet 39 operatively connected by means of a pawl 40 with a gear wheel 41 loose on said winding post, the pinion 42, gear wheel 43, pinion 44, escapement wheel 45, escapement lever or pallet 46, and the balance wheel 47 connected with the usual hair or balance spring (not shown).

The winding post 38 extends to the exterior of the casing where it is provided at one end with a pointer or indicator 48 cooperating with a suitable dial or scale 49, and at the other end with a suitable winding key 50. Mounted on the winding post 38 is a cam 51 having a notch 52 adapted to receive a nose 53 formed on the lever 35.

By turning the key 50 the indicator 48 is moved over the dial 49 to indicate the time at which the exposure is to take place, the cam 51 is simultaneously rotated, thereby bringing the notch 52 to a greater or less angular distance from the nose 53, and the main spring 37 is at the same time wound up to a greater or less degree. After the starting of the clockwork, by means hereinafter described, the cam 51 is caused to rotate slowly until the notch 52 is brought beneath the nose 53, whereupon the levers 31 are allowed to move under the influence of their spring 33, to release the plunger 22 and cause a compression of the bulb.

All of the parts thus far described may, except as herein pointed out, be substantially the same as the corresponding parts described and shown in my patent aforesaid, to which reference may be had for a more complete description.

In the apparatus shown in my said prior patent various parts of the mechanism were supported or guided, or had their bearing in or upon the casing 12. In order to provide a sufficient material for the necessary bearings, guides, etc., it was necessary to make this casing of an undesirable thickness, thereby producing an objectionable weight in the apparatus as a whole. It is one of the objects of the present invention to overcome this objection, which is preferably done by providing a skeleton frame comprising a skeleton back plate 54, and a skeleton front plate 55 connected by the plates 23, 23, forming the guides for the plunger 22. The plates 54 and 55 are of a sufficient thickness to provide the necessary material for the required bearings, guides, supports, etc., but containing material only where the same is necessary for such purposes, being cut away at other parts. The necessary material being thus furnished by the skeleton frame the exterior casing 12 may be made of very thin, light material, and the total weight of the apparatus thereby materially decreased. The skeleton frame is preferably made to conform in general outline substantially to the interior of the casing 12, and is secured thereto by suitable screws or other fastenings. The clockwork is preferably mounted in an auxiliary frame 102 suitably secured within the main skeleton frame.

As in the apparatus described in my prior patent, means are provided for holding the clockwork inoperative after the same has been wound and set, until the operator wishes the same to start, thereby defining the beginning of the period after which the exposure is to take place. As herein shown such means comprise a flat spring or resilient stop 56 adapted to engage a shoulder 57 formed upon the pallet 46, thereby holding the same against movement. For removing the stop 56 there is provided a cam 58 secured to a shaft 59 projecting through the rear of the casing 12 where it is provided with a suitable handle or key, herein shown as a crank 60. When the cam 58 is in the position shown in Fig. 5 the spring 56 will be raised and the clockwork released. By turning the shaft 59 through an angle of substantially 90° the spring 56 is allowed to engage the shoulder 57 as above described.

In order to secure accuracy and to obviate the necessity of shaking the apparatus as might sometimes occur when the clockwork has been locked for a considerable time, the present invention contemplates the provision of means for positively starting the clockwork upon the release thereof by the withdrawal of the stop 56. As herein shown such means are as follows: Pivoted at 61 in the clockwork frame is a lever 62 provided at the end of one arm with a finger 63 and normally held in the position shown in Fig. 5 by the spring 64. Pivoted to the lever 62 at 65 is a dog 66 normally held in the position shown in Fig. 5 by a spring 67 connected to said dog and to the lever 62, said dog having its end projected or extended into the path of movement of a projection 68 formed upon the cam 58 when the latter is turned as above described. As will now be seen, when the cam 58 is rotated from right to left, in order to allow the stop 56 to engage the shoulder 57, the projection 68 will engage the dog 66 and lift and pass the same without moving the lever 62. Upon the movement of the cam 58 from left to right in order to raise the stop 56 and release the clockwork, the projection 68 will again engage the dog 66, this time moving the lever 62 and causing the finger 63 to engage the pallet lever 46, giving the same an initial impetus, the projection 68 thereafter passing the dog 66 and allowing the lever 62 to resume its initial position under the influence of the spring 64.

After the operation of the parts as above described for compressing the shutter bulb, it is necessary that these parts be reset prior to another exposure of the camera. The first step in the resetting operation, after again locking the clockwork, is the withdrawal of the plunger 22 into the position shown in Fig. 4, and to this end the said plunger is provided with a chain or other connector 69 terminating in a suitable knob or handle 70 located at the exterior of the casing 12, and provided with a shank 71 to which said chain or connector 69 is attached, as by a suitable plate 72 mounted on said shank 71 and abutting against a pin or other projection 73. The shank 71 with its attached connector is adapted to pass through an elongated opening 74 in the casing 12, and through a similar opening in the skeleton plate 54, said opening in the casing being normally closed by a plate 75 carried by the knob 70.

Means are provided for securing the knob 70 to the casing after the resetting of the plunger 22, such means, as herein shown, comprising a plate 76 slidably mounted on the shank 71 and held against rotation thereon by pins 77, said plate being normally held toward said knob or handle 70 by a spring 78. Upon the interior of the casing there is provided one or more cams 79, preferably formed upon inturned ends or extensions of the plates 30. The construction is such as to permit the plate 76 to pass through the opening 74 in one angular position of the shank 71, and thereafter upon turning the knob 70 to another angular position through an arc of substantially 90° to cause said plate to engage the cam 79, thereby forcing the knob 70 into close engagement with the casing and locking the same therein.

After the withdrawal of the plunger 22 into its normal or set position it is necessary to lock the same therein by replacing the levers 31 in locking position, and to this end the lever 35 is extended beyond the point of attachment of the links 34 and is provided at its end with a pivotally attached resetting rod 80 extended upwardly through a suitable opening in the casing. A downward pressure upon the rod 80 will cause the nose 53 to be raised out of the notch 52 and the levers 31 to return to their locking or plunger-restraining position. With the apparatus constructed as described in my prior patent above referred to it was necessary, in order to maintain the levers 31 in this position, to give the winding post 38 a partial turn in order to remove the notch 52 from beneath the nose 53. It is one of the objects of the present invention to provide means for obviating this necessity, and to this end means are herein provided other than the time-controlling mechanism for locking or holding the shutter operating mechanism inoperative.

As herein shown the resetting rod 80 is provided with a notch 81 adapted to receive a lock formed as a lever 82 pivoted to the frame at 83, and normally held in locking engagement with said notch by a spring 84. The lever 82 is provided with an arm 85 adapted to be engaged by a shoulder 86 formed upon a link 87 guided in its movement by a radius arm 88 suitably pivoted to the frame and connected preferably by a pin and slot or other lost-motion connection, with a segment plate 89 carried by the shaft 59. With the construction just described when the shaft 59 is turned to lock the clockwork the link 87 will be moved to permit the lock 82 to enter the notch 81 of the resetting rod 80, so that when this rod is depressed to reset the shutter operating mechanism it will be automatically locked until the time-controlling mechanism has been set and started. The turning of the shaft 59 to release the clockwork will cause a simultaneous removal of the lock 82, thereby placing the shutter-operating mechanism under the control of the time-controlling mechanism.

In order to insure accurate time-control and in order that the resetting rod 80 may always be locked as above described, it is desirable that means be provided to compel the locking of the clockwork before the resetting of the mechanism, and to this end means are herein provided for preventing the resetting of the shutter operating mechanism when the stop for the clockwork is inoperative, such means preferably comprising a lock for preventing withdrawal of the plunger 22, and a second lock for preventing the depression of the resetting rod 80. In the construction herein shown the following mechanism is provided. The resetting rod 80 is formed with a second notch 90 adapted to receive the end of a locking bar 91 guided in its movement by a suitably pivoted radius arm 92, and pivoted at its opposite end to a lever 93 fulcrumed at 94 and having one arm arranged in the path of a cam 95 secured to the shaft 59. The opposite arm of the lever 93 is connected by a link 96 with a lever 97 to the end of which is pivoted a second locking bar 98 adapted to be moved into a position behind one of the plates 25 when the plunger 22 is in its forward position. Pivoted to the bar 98 is a lever 99 fulcrumed at 100 to the frame, and normally held in a position to cause the lock 98 to be projected into its locking position by a spring 101. It will now be seen that when the shaft 59 is turned to release the clockwork the mechanism last described will be placed under the influence of the spring 101, so that immediately upon the release of the mechanism for the purpose of exposing the camera the locking bar 98 will be projected behind the plate 25 and the locking bar 91 will enter the notch 90, thereby preventing the resetting of the mechanism. When the shaft 59 is turned to lock the clockwork the cam 95 will engage the lever 93, thereby simultaneously withdrawing the locking bars 91 and 98.

The operation of setting the mechanism for an instantaneous exposure may now be briefly reviewed as follows: The apparatus being suitably suspended, as described in my prior patent above referred to, or otherwise supported in any suitable manner, the drawer is pulled out and the shutter bulb placed therein. The key 50 is then turned to cause the pointer 48 to indicate upon the dial 49 the time to elapse prior to the exposure. The crank 60 is then turned through an angle of substantially 90°, thereby releasing the clockwork and causing the finger 63 to impart an initial impetus thereto. The parts are now substantially in the position shown in the drawings. The clockwork will now run until the notch 52 of the cam 51 is brought beneath the nose 53 of the lever 55, whereupon said nose will enter said notch, the plunger will be released, the exposure made, and the clockwork stopped. The plunger 22 being at this time projected forwardly and the resetting rod 80 being elevated, the spring 101 will throw the locking bars 91 and 98 into operative position. The first operation of resetting the parts is to return the crank 60 to its original position, thereby permitting the stop 56 to lock the clockwork, causing the cam 95 to withdraw the locking bars 91 and 98 against the influence of the spring 101, and causing the shoulder 86 to be disengaged from the arm 85, thereby placing the lock 82 under the influence of its spring 84. The plunger 22 is now withdrawn by means of the handle 70 and its attached connector, and the resetting rod 80 is depressed to cause the levers 31 to lock said plunger in its withdrawn position, the lock 82 simultaneously entering the notch 81 and holding the shutter operating mechanism in its reset position until the clockwork is again set and released. The parts are now in position for the clockwork to be reset as above described for another exposure.

Having thus described my invention I claim and desire to secure by Letters Patent:

1. In an apparatus of the character described, in combination, shutter operating mechanism, time-controlling mechanism for regulating the operation of said shutter operating mechanism, means for holding said time-controlling mechanism inoperative, and means for simultaneously removing said holding means and positively starting said time-controlling mechanism.

2. In an apparatus of the character described, in combination, shutter operating mechanism, time controlling mechanism for regulating the time of operation of said shutter operating mechanism, means for holding said time controlling mechanism inoperative, means for positively starting said time controlling mechanism, and means for simultaneously removing said holding means and actuating said starting means.

3. In an apparatus of the character described, in combination, means for compressing the bulb of a camera shutter, a clockwork for controlling the time of operation of said means, means engaging a moving part of said clockwork for holding the same inoperative, and means for removing said holding means and for simultaneously imparting an impetus to said moving part.

4. In an apparatus of the character described, in combination, means for compressing the bulb of a camera shutter, a clockwork for controlling the time of operation of said means and having a vibrating pallet, a stop adapted to engage said pallet to hold said clockwork inoperative, a finger adapted to impart an impetus to said pallet for starting said clockwork, and means for simultaneously removing said stop and actuating said finger.

5. In an apparatus of the character described, in combination, mechanism for operating the shutter of a photographic camera, a time-controlling mechanism and connections for controlling the time of operation of said shutter operating mechanism, means other than said time controlling mechanism for locking said shutter operating mechanism, and manually operated means for releasing said locking means.

6. In an apparatus of the character described, in combination, mechanism for operating the shutter of a photographic camera, a time controlling mechanism therefor, means other than said time controlling mechanism for locking said shutter operating mechanism, and mechanism for simultaneously starting said time controlling mechanism and placing said shutter operating mechanism under the control thereof.

7. In an apparatus of the character described, in combination, means for compressing the bulb of a camera shutter, a clockwork and connections for controlling the time of operation of said means, and a manually controlled stop for holding said bulb compressing means inoperative.

8. In an apparatus of the character described, in combination, an actuator for operating the shutter of a photographic camera, means for restraining said actuator, a time controlling mechanism and connections for controlling the time of release of said restraining means, means other than said time-controlling mechanism for holding said restraining means, and manually operated means for releasing said holding means.

9. In an apparatus of the character described, in combination, an actuator for operating the shutter of a photographic camera, means for restraining said actuator, a time controlling mechanism and connections for controlling the time of release of said restraining means, means for resetting said restraining means after the operation of said shutter operating means, and means for locking said resetting means.

10. In an apparatus of the character described, in combination, mechanism for operating the shutter of a photographic camera, a time-controlling mechanism for said shutter operating mechanism, means other than said time-controlling mechanism for holding said shutter operating mechanism inoperative, means for holding said time controlling mechanism inoperative, and means for simultaneously releasing both of said holding means.

11. In an apparatus of the character described, in combination, means for operating the shutter of a photographic camera, a time controlling mechanism therefor, a stop for said time controlling mechanism, a resetting rod, a lock for said resetting rod, and operative connections intermediate said stop and lock.

12. In an apparatus of the character described, in combination, mechanism for operating the shutter of a photographic camera, a clockwork, means operated by said clockwork for controlling said shutter operating mechanism, and means for locking said shutter operating mechanism in reset position prior to the resetting of said controlling means.

13. In an apparatus of the character described, in combination, mechanism for operating the shutter of a photographic camera, a time controlling mechanism therefor, means for holding said time controlling mechanism inoperative, and means for preventing the resetting of said shutter operating mechanism when said holding means is inoperative.

14. In an apparatus of the character described, in combination, mechanism for operating the shutter of a photographic camera, a clockwork for controlling the time of operation of said mechanism, a stop for said clockwork, a lock for preventing the resetting of said shutter operating means, and means for simultaneously withdrawing said lock and applying said stop.

15. In an apparatus of the character described, in combination, mechanism for operating the shutter of a photographic camera, a clockwork for controlling the time of operation of said mechanism, a stop for said clockwork, a plurality of locks for preventing the resetting of said shutter operating means, and means for simultaneously withdrawing said locks and applying said stop.

16. In an apparatus of the character described, in combination, mechanism for operating the shutter of a photographic camera, a time controlling mechanism therefor, a lock for preventing the resetting of said shutter operating mechanism after an operation thereof, a spring for actuating said lock, and mechanism for simultaneously placing said lock under the influence of its spring and rendering said time controlling mechanism operative.

17. In an apparatus of the character described, in combination, a plunger, a clockwork and connections for controlling said plunger, means for holding said clockwork inoperative, and means for preventing the resetting of said plunger when said holding means is inoperative.

18. In an apparatus of the character described, in combination, means for compressing the bulb of a camera shutter, means for restraining said bulb compressing means, a clockwork and connections for controlling said restraining means, means for holding said clockwork inoperative, and means for preventing the resetting of said restraining means when said holding means is inoperative.

19. In a device of the character described, in combination, mechanism for operating the shutter of a photographic camera, a time controlling mechanism therefor, a lock for preventing the resetting of said shutter operating mechanism, means for actuating said lock to render the same operative, and mechanism for simultaneously placing said lock under the influence of its actuating means and positively starting said time-controlling mechanism.

20. In an apparatus of the character described, in combination, mechanism for operating the shutter of a photographic camera, a time-controlling mechanism therefor, means for holding said time-controlling mechanism inoperative, means for holding said shutter operating means inoperative, means for preventing the resetting of said shutter operating means, and mechanism for simultaneously releasing both said holding means and rendering said preventing means operative.

21. In an apparatus of the character described, in combination, mechanism for operating the shutter of a photographic camera, a time-controlling mechanism therefor, means for holding said time-controlling mechanism inoperative, means for holding said shutter operating means inoperative, means for preventing the resetting of said shutter operating means, and mechanism for simultaneously rendering both said holding means operative and said preventing means inoperative.

22. In an apparatus of the character described, in combination, mechanism for operating the shutter of a photographic camera, a time controlling mechanism therefor, means other than said time controlling mechanism for holding said shutter operating mechanism, and mechanism for simultaneously releasing said holding means and positively starting said time-controlling mechanism.

23. In an apparatus of the character described, in combination, mechanism for operating the shutter of a photographic camera, a time controlling mechanism therefor, means other than said time controlling mechanism for locking said shutter operating mechanism, and means for preventing the resetting of said shutter operating mechanism when said locking means is inoperative.

24. In an apparatus of the character described, in combination, time controlling mechanism, a casing therefor having an elongated opening, a plunger controlled by said mechanism and operating in said casing, means for setting said plunger, said means including a handle or knob on the exterior of said casing and having a shank adapted to project thereinto through said opening, a plate non-rotatably mounted on said shank, said plate being adapted to pass through the opening in said casing in one angular position of said shank and to be retained therein in a different angular position of said shank, and a cam within said casing and adapted to be engaged by said plate.

25. In an apparatus of the character described, in combination, means for operating a camera shutter, a clockwork, means for locking said clockwork, operative connections between said shutter operating means and said clockwork for controlling the time of operation of said operating means, said connections being constructed and arranged to cause a discontinuation of the movement of said clockwork simultaneously with the operation of said shutter operating means and to permit such movement again upon resetting of said connections preparatory to another operation of said operating means, means for resetting said operative connections, means for locking said connections against resetting, and means for removing said last named locking means simultaneously with the locking of said clockwork by said first-named locking means.

26. In an apparatus of the character described, the combination with means for operating the shutter of a photographic camera comprising an actuator and means for restraining said actuator, of a time controlling mechanism, means for locking said time controlling mechanism, means controlled by said time controlling mechanism for simultaneously releasing said shutter operating means and causing the discontinuation of the movement of said time-controlling mechanism, means for resetting said shutter operating means after the operation thereof, means for locking said shutter operating means against resetting, and means for removing said last-named locking means simultaneously with the locking of said time-controlling mechanism by said first-named locking means.

27. In an apparatus of the character described, in combination, means for holding the end of a flexible power transmitter, means for operating upon said transmitter, means for restraining said operating means, means for withdrawing said restraining means, a time controlling mechanism, an element moving with said time controlling mechanism adapted to hold said restraining means in operative position and to release the same at a predetermined time, means other than said time controlling mechanism and said element for holding said restraining means in operative position, and manually operated means for removing said last named holding means.

28. In an apparatus of the character described, in combination, means for holding the end of a flexible power transmitter, means for operating upon said transmitter, means for restraining said operating means, means for withdrawing said restraining means, a time controlling mechanism, an element moving with said time controlling mechanism adapted to hold said restraining means in operative position and to release the same at a predetermined time, means for locking said time controlling mechanism, means other than said time controlling mechanism and said element for holding said restraining means in operative position, and manually operated means for removing said last-named holding means and simultaneously releasing said time controlling mechanism.

29. In an apparatus of the character described, in combination, means for holding the end of a flexible power transmitter, means for operating upon said transmitter, means for restraining said operating means, means for withdrawing said restraining means, a time controlling mechanism, an element moving with said time controlling mechanism adapted to hold said restraining means in operative position and to release the same at a predetermined time, means for locking said time controlling mechanism, means other than said time controlling mechanism and said element for holding said restraining means in operative position, and manually operated means for removing said last-named holding means and simultaneously releasing and positively starting said time controlling mechanism.

In testimony whereof I affix my signature, in presence of two witnesses.

ARTHUR LATTAU.

Witnesses:
 JOHN L. ROGERS,
 ROBT. C. HARDING.

Copies of this patent may be obtained for five cents each, by addressing the "Commissioner of Patents, Washington, D. C."